Dec. 13, 1938.   R. S. DANFORTH   2,140,450
METHOD OF DISTILLING HYDROCARBON OILS
Filed April 26, 1934   2 Sheets-Sheet 1
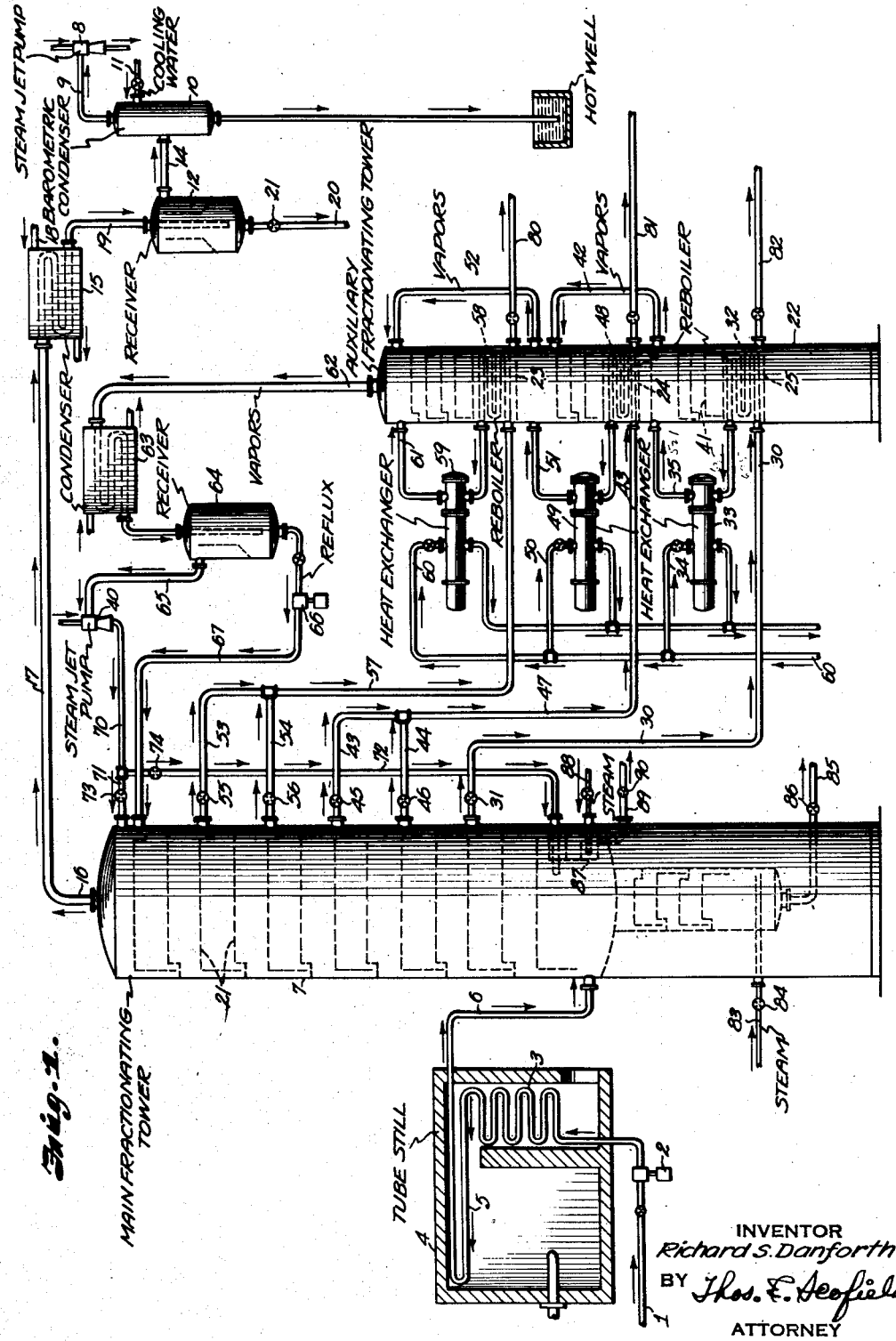
INVENTOR
Richard S. Danforth
BY Thos. E. Scofield
ATTORNEY

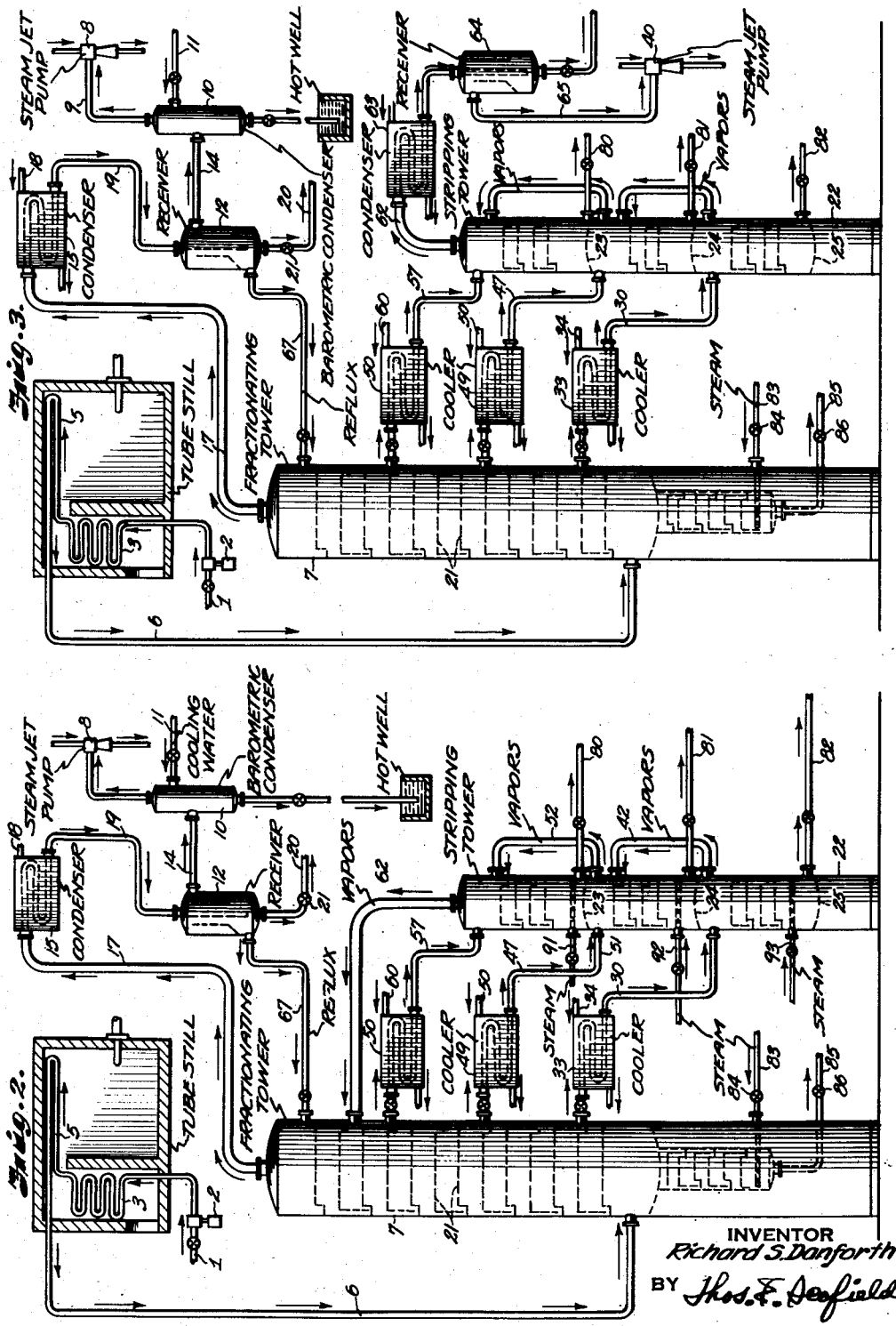

Patented Dec. 13, 1938

2,140,450

UNITED STATES PATENT OFFICE 2,140,450

METHOD OF DISTILLING HYDROCARBON OILS

Richard S. Danforth, Berkeley, Calif., assignor, by mesne assignments, to American Locomotive Company, New York, N. Y., a corporation of New York Application April 26, 1934, Serial No. 722,457

6 Claims. (Cl. 196—77)

My invention relates to a method of distilling hydrocarbon oils.

In vol. 11 of the Refiner & National Gasoline Manufacturer, published in July, 1932, I discussed the effect of vacuum on lubricating oil distillation, and particularly pointed out that the percentage decrease in vapor pressure of heavy hydrocarbon fractions for a given temperature drop is greater than that for lighter hydrocarbon fractions and increases greatly with the lowering of the distillation temperature. It is possible, because of this, when operating at a lower temperature in the stripping column, to remove a larger cut from a side stream with equivalent flash or to secure a better flash when removing the same percentage of material.

One object of my invention is to provide a method of distillation which will secure improved separation of the fractions in the stripping column.

Another object of my invention is to provide a method of distillation which will permit the obtaining of large yields without the necessity of overheating the oil.

Another object of my invention is to provide a method of distillation which will reduce the time the oil is exposed to high temperatures and thus minimize the danger of cracking.

Another object of my invention is to provide a method of distilling oil which, for a given flash on a side stream, will enable me to remove a larger amount of light material in the stripping section, thus permitting me to operate the main fractionating tower with fewer trays.

Another object of my invention is to provide a method of vaccum distillation in which the pressure drop through the fractionating tower is reduced.

Still another object of my invention is to provide a method of distilling oil in which I may employ a fractionating tower of less height.

Another object of my invention is to provide a method of distilling oil which will permit me to carry a lower temperature at the point of flash.

Other and further objects of my invention will appear from the following description.

In the accompanying drawings which form part of the instant specification and in which like reference numerals have been used to indicate like parts in the various views, Figure 1 is a schematic view of one form of apparatus capable of carrying out the process of my invention.

Figure 2 is a schematic view of a modified form of apparatus capable of carrying out my method of distillation.

Figure 3 is a schematic view of another modified form of apparatus capable of carrying out the process of my invention.

Referring now to Figure 1 in which I have shown the preferred arrangement of a distillation apparatus capable of carrying out my invention, I charge the hydrocarbon oil to be distilled through line 1 from which it is pumped by pump 2 through the convection section 3 of tube still 4, through radiant heat section 5 of the tube still, through transfer line 6, into the main fractionating tower 7. The fractionating tower is maintained under a reduced pressure by means of steam jet pump 8, pulling a vacuum through line 9, connecting it to barometric condenser 10, into which cooling water is discharged through line 11. Barometric condenser 10 communicates with receiver 12 through line 14. The receiver is adapted to accumulate the vapors condensed in condenser 15. The vapors withdrawn from the head of the main fractionating tower 16 through line 17 are cooled in condenser 15 which is furnished with cooling water through line 18. The condensate passes from the condenser 15 through line 19 to the receiver 12 from which it is withdrawn through line 20 which is controlled by valve 21 and passed to storage. Reflux condensate collects on the various trays 21 of the main fractionating tower 7.

I provide an auxiliary fractionating tower 22 which is divided into a plurality of sections by solid partitions 23, 24, and 25 so that, in effect, I have three separate sections, one on top of the other. The salient feature of my invention is the cooling of a side stream and its introduction to a stripping or sub-fractionating zone, which is maintained at lower pressure. This permits me to obtain an improved separation of fractions in the sub-fractionating tower. The cooling of the oil immediately upon leaving the main fractionating tower reduces the time the oil is exposed to high temperature and hence the danger of cracking. By enabling me to remove a larger amount of light material in the sub-fractionating tower, I am enabled to reduce the height of the main fractionating tower and to use fewer trays. This materially reduces the pressure drop through the fractionating tower and permits me to carry a lower temperature at the point of flash, inasmuch as the pressure will be lower. In the form shown in Figure 1, it will be observed that a side stream is withdrawn through line 30 which is controlled by valve 31. The oil from line 30 passes through reboiler 32 in the base of the lowest section of the auxiliary fractionating tower 22, and then passes through heat exchanger 33 in which the oil is cooled by a suitable cooling agent through line 34. The cooled liquid is then discharged into the upper portion of the lowest section of the auxiliary fractionating tower through line 35. The auxiliary fractionating tower is maintained under a lower absolute pressure than the main fractionating tower, by means of steam jet pump 40, which pulls a vacuum on the auxiliary fractionating tower.

This arrangement enables me to utilize the sensible heat of the side stream for reboiling and, by cooling the liquid oil after it leaves the reboiler below the temperature at the top of the stripping section, a reflux condensate is provided. I am enabled in this manner to secure true fractionating action on each plate 41 of the auxiliary fractionating tower, as distinguished from the usual simple stripping action. The intermediate section of the auxiliary fractionating tower communicates with the lowest section through line 42. The light ends and vapors from the lowest tower pass through line 42 into the intermediate section. Into the intermediate section, I also discharge a lighter side stream removed through lines 43 and 44 by the manipulation of valves 45 and 46. The side stream passes through line 47, through reboiler 48 in the intermediate section of the auxiliary fractionating tower, through heat exchanger 49, which is supplied with a cooling medium through line 50. The cooled oil is then discharged through line 51 to the upper portion of the intermediate section of the auxiliary fractionating tower, acting as a reflux condensate. It will also be observed that, by carrying the vapors from the lowest section of the auxiliary fractionating tower to the intermediate section, which will be somewhat cooler, a portion of the vapors will be condensed. The uncondensed vapors from the intermediate section pass through line 52 into the highest section of the auxiliary fractionating tower. A still lighter fraction of reflux condensate in the main fractionating tower is withdrawn as a side stream through line 53 or 54, controlled by valves 55 and 56. This side stream passes through line 57, through reboiler 58, through heat exchanger 59, which is supplied with a cooling medium through line 60. It will be observed that lines 50 and 34 communicate with the same source of supply. The cooled side stream leaves heat exchanger 59 through line 61 and is discharged into the upper portion of the highest section of the auxiliary fractionating tower. This enables me to condense a portion of the vapors entering from the intermediate section so that the only vapors which I must remove through line 62 communicating with the head of the highest section of the auxiliary fractionating tower are those which are uncondensed in the upper section.

These vapors pass through line 62, through condenser 63, the condensate of which passes to a receiver 64 which is maintained under reduced pressure by the steam jet pump 40 which communicates therewith through line 65. The arrangement is such that the steam jet pump 40 maintains the auxiliary fractionating tower under a low absolute pressure as for example between 5 and 10 millimeters of mercury. It is to be remembered that the auxiliary fractionating tower is always maintained at a lower absolute pressure than the main fractionating tower. The condensate from receiver 64 is pumped by pump 66 through line 67 which returns the condensate to any desired place in the main fractionating tower 7, though I prefer to return the condensate to that plate of the main tower on which reflux condensate of substantially the same composition collects. The uncondensed vapors will be relatively small in quantity. For this reason, I discharge the steam jet pump into the steam of which the uncondensed vapors are entrained through line 70 from which they may be discharged through line 71 to the upper portion of the tower, or through line 72 depending upon the actuation of the valves 73 and 74. If the vapors are returned to the plate near the top of the main fractionating column, that is through line 71, by the opening of valve 73 and the closing of valve 74, the discharge pressure of the steam jet pump 40 will be less than if the vapors are returned to the flash zone of the tower through line 72. In returning the vapors to the point of flash or in its vicinity, I obtain the benefit of the partial pressure effect of the steam in lowering the flash zone temperature. The partial pressure effect of the light vapors will also be had.

In the operation of my process, using the form of apparatus shown in Figure 1, it being remembered that the following description is merely for purposes of illustration and is not to be considered as a limitation, the side stream withdrawn through line 30 may be at a temperature of about 695° F. That withdrawn through line 47 may be about 570° F. That withdrawn through line 57 may be about 400° F. The side stream through line 57 leaves the reboiler at a temperature of about 350° F., which temperature is reduced to about 200° F. by the heat exchanger 59. The entire auxiliary fractionating tower is kept at a high vacuum of about 5 millimeters of mercury. The side stream through line 47 leaves the reboiler at about 510° F. which temperature is reduced by heat exchanger 49 to 385° F. The side stream withdrawn through line 30 leaves the reboiler 32 at about 635° F., which temperature is reduced in heat exchanger 33 to 521° F. The material on the top tray of the uppermost section will have a boiling point of about 275° F. The material withdrawn from the uppermost section through line 80 will be at a temperature of about 305° F. This material is cooled and pumped to storage. The material on the top tray of the intermediate section will be at a temperature of about 418° F. and the oil withdrawn through line 81 at a temperature of about 448° F. This oil is also cooled and passed to storage. The material on the top tray of the lowermost section of the auxiliary fractionating tower will be at a temperature of about 548° F. and the material withdrawn through line 82 will be at a temperature of about 578° F., this material being also cooled and pumped to storage. The bottom fraction of the main fractionating tower may be stripped with steam entering through line 83 controlled by valve 84 and withdrawn from the tower through line 85 controlled by valve 86. The heaviest fraction of reflux condensate is stripped with steam in internal stripping section 87, the steam being supplied through line 88. The stripped heavy fraction is withdrawn from the stripping section through line 89 controlled by valve 90. The distillation range of the first side stream withdrawn from the main fractionating tower may be between 280° and 405° F., that of the second side stream between 405° F. and 560° F. The distillation range of the third side stream may be between 560° F. and 650° F. The vapors withdrawn through line 17 from the main fractionating tower will have a temperature of about 310° F. in the example given. The side stream withdrawn through line 82 will be a heavy cylinder stock free of light ends.

In the form of the invention shown in Figure 2, the operation it will be observed, is identical to that shown in Figure 1 with the exception that the side streams are cooled directly and then discharged to the respective sections of the auxiliary fractionating tower, which may be termed a stripping tower inasmuch as open steam is supplied to each section through lines 91, 92, and 93, similar to a commercial stripping column. The cooled side streams, however, entering the respective sections of the tower 22 through lines 57, 47, and 30 act as a reflux condensate. In other words, the vapors from the lowest section of tower 22 entering the intermediate section through line 42 will be condensed in part by the cooled side stream entering through line 51. The line 62 from the head of the tower 22 communicates with the main tower at a high point therein, near the point of highest vacuum. The partial pressures in the stripping tower will be reduced by the use of open steam.

In the modification shown in Figure 3, reduction in sensible heat is obtained without the use of stripping steam, the tower 22 being maintained under a much lower absolute pressure than the main fractionating tower 7 by means of steam jet pump 40. In the form shown in Figure 3, however, the steam jet pump 40 does not discharge into the main fractionating tower, as is the case in the form shown in Figure 1.

It will be observed that my process may be employed in distillation systems operating at higher pressures, it not necessarily being limited to vacuum operation. In other words, all that is necessary is that the auxiliary fractionating tower be at a lower pressure than the main fractionating tower so that a side stream may be cooled and introduced into the auxiliary fractionating tower at a lower temperature in order to improve the separation of the fractions. Reference may be had to my article in the Refiner, above referred to, illustrating the fact that the percentage decrease in vapor pressure of heavy hydrocarbon fractions for a given temperature drop is greater than that for lighter hydrocarbon fractions and increases greatly with a lowering of the distillation temperature.

It is believed that the operation of my process will be clear from the foregoing description. It will be seen that I have accomplished the objects of my invention. I am enabled to secure improved separation of fractions in an auxiliary stripping tower. By reducing the partial pressure in the auxiliary fractionating tower or by maintaining the tower under reduced pressure, I am enabled to obtain separation at lower temperatures, thus obtaining improved separation of fractions. By cooling the oil immediately upon its leaving the main fractionating tower, I am enabled to reduce the time the oil is exposed to high temperature, thus minimizing the danger of cracking. I am enabled to remove a larger amount of light material for a given flash on a side stream product. I am enabled to operate the main fractionating tower with fewer trays. I am enabled thus to reduce the height of the tower and reduce the pressure drop through the main fractionating tower permitting the carrying of a lower temperature at the point of flash.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

For example, while I have shown the passing of the lighter ends removed in the stripping section to another stripping section in which a lower boiling side stream is being stripped, I may reintroduce the stripped products into the main fractionating tower for refractionation. These lighter products will also reduce the partial pressures in the main fractionating tower. I may, if desired, remove the respective light products from the various stripping sections and subject them to condensation. The condensates may then be reintroduced to the main fractionating tower and the uncondensed vapors and gases be combined and introduced to the steam jet pump which discharges into the tower. The condensers used to condense the lighter products removed by stripping are located high enough to drain by gravity to the main tower. The condensates from the condensed stripped products may be introduced to the main tower either above or below the point from which the main stream is being withdrawn.

The basic feature of my invention is the cooling of a side stream between the main fractionating tower and the stripping section.

Having thus described my invention, what I claim is:

1. In the distilling of hydrocarbon oils wherein a hydrocarbon oil is heated to distilling temperature to form vapors, the vapors fractionally condensed in a fractionating zone to form fractional condensates, removing a fractional condensate as a side stream of oil, cooling the side stream, introducing it into a stripping zone, maintaining the stripping zone under a pressure lower than that in the fractionating zone, reboiling the oil in said stripping zone and supplying the heat of reboiling from the side stream before it is cooled.

2. A process as in claim 1 wherein the vapors evolved in the stripping zone are introduced into the fractionating zone.

3. A process as in claim 1 wherein the fractionating zone is maintained at a sub-atmospheric pressure, higher than the pressure in said stripping zone.

4. In a process as in claim 1 wherein a plurality of side streams are stripped in a plurality of respective stripping zones, removing of vapors evolved in one of said stripping zones and introducing them into another of said stripping zones in which a lower boiling side stream is being stripped.

5. In the distilling of hydrocarbon oils wherein a hydrocarbon oil is heated to distilling temperature to form vapors, the vapors fractionally condensed in a fractionating zone and a fractional condensate is removed as a side stream; the steps of partially cooling the withdrawn side stream; introducing it into a stripping zone; maintaining the stripping zone under a pressure lower than that in the fractionating zone to permit the removal of vapors from the side stream in said stripping zone by the sensible heat thereof at lower temperature whereby sharper separation of the desired fraction is obtained; reboiling the oil in said stripping zone; and, supplying the heat of reboiling by the withdrawn side stream before it is cooled.

6. In the distilling of hydrocarbon oils wherein a hydrocarbon oil is heated to distilling temperature to form vapors, the vapors fractionally condensed in a fractionating zone and fractional condensates are removed as side streams; partially cooling the withdrawn side streams; introducing respective side streams into respective stripping zones; maintaining each of said zones under a pressure lower than that in the fractionating zone to permit the removal of vapors from the side stream in a stripping zone by the sensible heat thereof at lower temperature whereby sharper separation of the desired fraction is obtained; and, introducing the vapors evolved in one of said stripping zones from a side stream into another of said stripping zones wherein a lower boiling side stream is being stripped.

RICHARD S. DANFORTH.